Oct. 31, 1939.  R. E. TETENS  2,178,351
GYROSCOPIC STABILIZER
Filed Jan. 7, 1938   2 Sheets-Sheet 1

Inventor
Raymond E. Tetens
Samuel H. Davis
Attorney

Oct. 31, 1939.   R. E. TETENS   2,178,351
GYROSCOPIC STABILIZER
Filed Jan. 7, 1938   2 Sheets-Sheet 2

Inventor
Raymond E. Tetens
By
Samuel H. Davis
Attorney

Patented Oct. 31, 1939

2,178,351

UNITED STATES PATENT OFFICE 2,178,351

GYROSCOPIC STABILIZER

Raymond E. Tetens, Lansing, Mich.

Application January 7, 1938, Serial No. 183,903

3 Claims. (Cl. 105—141)

This invention relates to gyroscopic stabilizers, and comprises a gyroscope in combination with a gravity controlled pendulum or pendulums, which provide means for rendering and maintaining stable, a body or contrivance which is naturally unstable, or tends toward a position out of equilibrium. This invention is not a device for damping the oscillations of either the gyroscope or the pendulum. Furthermore, the pendulum is free to oscillate independently from the gyroscope, and the gyroscope oscillates freely and independently of the pendulum. But when a body or contrivance gets out of a position of equilibrium, the natural oscillations of both the gyroscope and pendulum cause friction surfaces in the device to contact the spinning axis of the gyroscope, thereby creating rolling friction which produces forced precession. It is a known fact that when forced precession is applied to a gyroscope suspended in a body or contrivance in such manner that the gyroscope is able to oscillate about a pivotal axis which is in a plane transverse to the line of support of the body or contrivance, the gyroscope will produce a torque in the direction of said transverse plane thereby causing the body or contrivance to swing about its line of support as an axis. Furthermore, if forced precession is applied in the direction in which the gyroscope is precessing, the gyroscope will absorb this force and return to its original position, which, in this invention is a normal vertical spin axis when the contrivance is in equilibrium. The arrangement of the gyroscope, and the said friction surfaces which are actuated by the pendulum, causes forced precession to develop instantly to exactly the correct magnitude and in the right direction, to restore the body or contrivance to a position of stabilization or equilibrium. Also, said arrangement produces a counter torque necessary to restore equilibrium exactly equal and opposite to whatever varying impulses may be applied to said contrivance which tends to destroy its equilibrium or lateral stability.

This invention consists of a gyroscope suspended in the body or contrivance, such that its spin axis is normally vertical, and its oscillating axis fixed transversely to the line of support of said contrivance, so that the gyroscope can oscillate in a longitudinal plane with respect to the contrivance, free from any damping device, and a gravity controlled pendulum suspended upon a longitudinal axis so that it can swing in a transverse plane; said pendulum, comprising in its entirety of construction, any mechanism controlled or operated by said pendulum which imparts to surfaces an oscillatory movement which, through contact of said surfaces with the spin axis of the gyroscope, produces forced precession in one direction or the other by rolling friction.

The objects of this invention are—

First, to provide a gyroscopic stabilizer employing but one gyroscope of simple construction, yet completely automatic, which will render stable any contrivance naturally unstable.

Second, to provide a gyroscopic stabilizer employing but one gyroscope, suspended independently of a gravity controlled pendulum, which will sustain a contrivance in a position of lateral stability without the use of damping devices, precession motors, viscosity pots, vacuum chambers, or any other devices not included in this specification, but heretofore usually associated with gyroscopic control mechanisms.

The applicant is aware that prior to his invention, numerous gyroscopic control and stabilizing devices have been made public and patented, employing a pendulum in the design to effect the oscillatory movements of gyroscopes.

The arrangement of gyroscope and pendulums for carrying into effect the principles which this invention covers, are illustrated in the accompanying drawings as applied to mono-rail vehicles.

Throughout the drawings and description the same letters and numbers refer to the same parts.

Figs. 1, 2, 3 and 4 of the drawings show the conditions existing when the contrivance is in equilibrium. In those figures the gyroscope spin axis 1A is normally vertical, and the contrivance 10, being in equilibrium, supports a pendulum 6 which controls the friction surfaces 5A and 5B so that neither of said friction surfaces touches the spin axis 1A, therefore, no forced precession exists.

Figure 1:
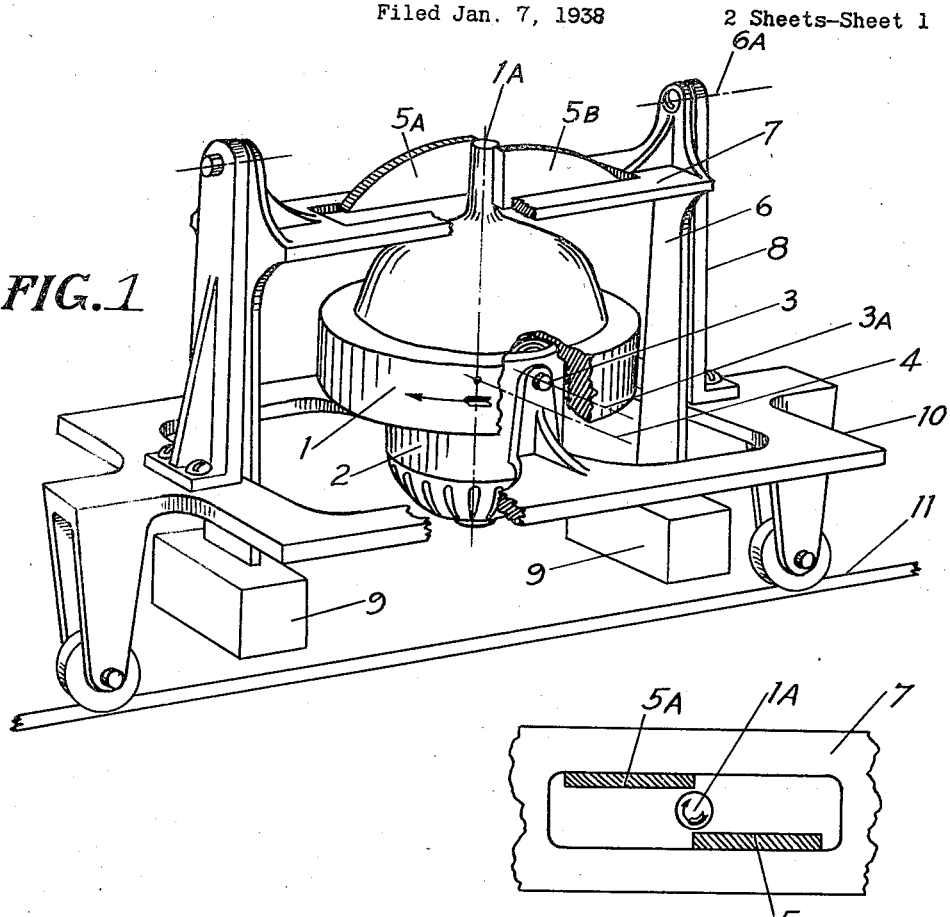
Fig. 1 represents a perspective view of the invention showing all parts assembled.
Figure 5:
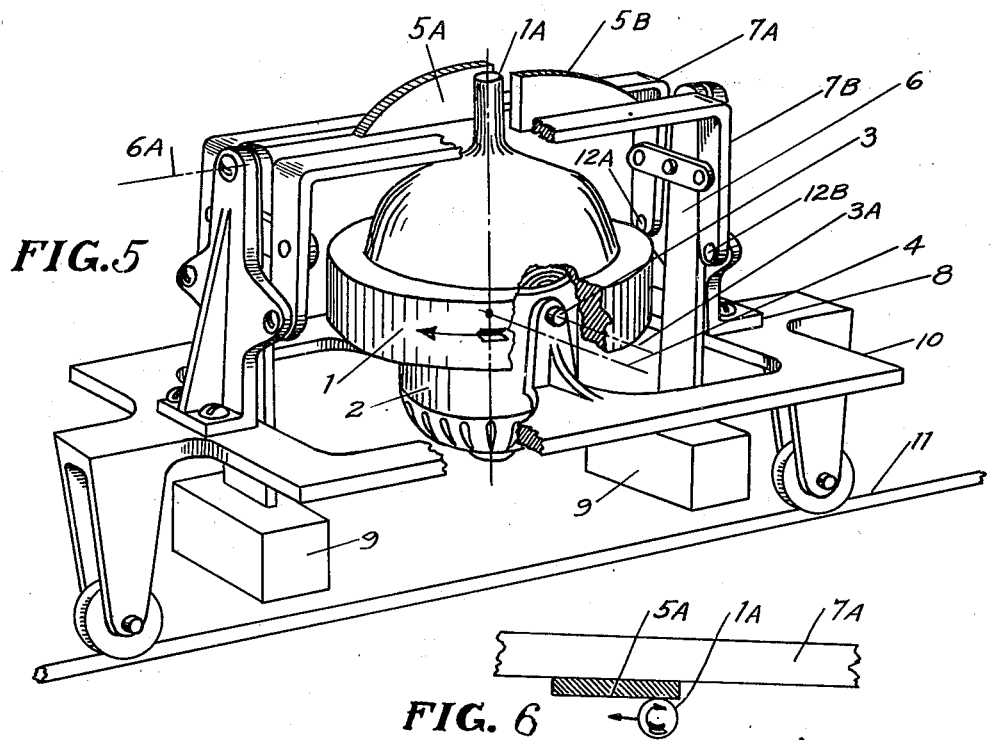
Fig. 5 is a perspective view similar to Fig. 1 showing a modified form of the invention, all parts being assembled.

Fig. 1 shows the friction surfaces 5A and 5B mounted upon a carrier 7 which is constructed as an integral part of the pendulum 6, of which 6A is the pendulum axis, 9 is the pendulum weight, and 8 is the standard supporting the pendulum. Although Figs. 1 and 5 of the drawings show the pendulum element consisting of two individual weights 9, and arms 6, the means of maintaining stability can be accomplished with but one weight of sufficient mass. In all the figures numeral 1 marks the gyroscope flywheel, 2 the gyro-motivating source of power, 3A the transverse oscillating axis, 3 the gyroscope suspension pivotal bearing, and 4 the position of the center of gravity of the oscillating gyroscope unit, showing its position below the oscillating axis 3A relatively. The line of support of the contrivance is marked 11, which in the case of any mono-track contrivance or vehicle can be a rail, cable, or any supporting body.

The Figs. 4, 5, 6, 8 and 9 represent the conditions existing when the contrivance loses its equilibrium and tends to fall to one side or the other. In these cases, at the instant the contrivance tips to either side, from a position of equilibrium, the gyroscope, being free to oscillate about axis 3A, swings about said axis 3A in a manner which obeys the basic law of gyroscopic phenomena. Simultaneously, the pendulum 6, and its component parts, swing into position on one side or the other of the line of support 11, due to the force of gravity pulling upon the pendulum weight 9. This swinging movement of the pendulum causes either of the friction surfaces 5A or 5B to contact the spinning axis of the gyroscope flywheel, thereby causing the said axis to roll with friction upon said friction surface, and causing forced precession. Said friction surfaces 5A and 5B located on the carrier 7 and shown in the drawings, are in positions depending upon the direction of rotation of the gyroscopic flywheel, so that contact of said friction surfaces with the said spin axis will force the precession and not retard it. Since the amount of forced precession produced by said contact must never be less than the magnitude required to restore equilibrium; the construction and arrangement of said friction surfaces, in combination with the diameter, disposition and speed of the rotation of the spin axis, together with the total weight of the gyroscope in proportion to the total weight of the contrivance, and a large factor of safety to allow for counteractive forces to overpower any sudden or continuous forces which would tend to overturn the contrivance such as wind pressure, centrifugal force when rounding a curve, or unequal distribution of weight in the contrivance or vehicle, all have to be accounted for in the final computation to insure absolute stability under all adverse conditions. This invention provides a means of accomplishing this simply by proportioning each part of the stabilizer to insure said factor of safety. The arrangement and operation of this combination of gyroscope and pendulums as herein described, without the employment of any damping means whatever, renders this invention absolutely automatic in its operation, and makes it impossible to develop too great a forced precession tending to cause the contrivance to over-go its position of equilibrium.

Figure 2:
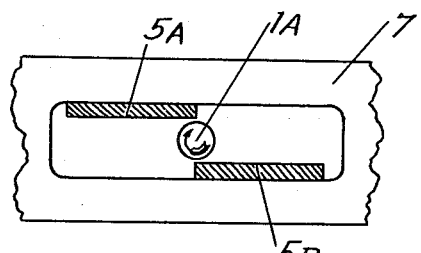
Fig. 2 is a fragmentary top plan view of the friction elements and spin axis of the gyroscope, shown in section.
Figure 3:
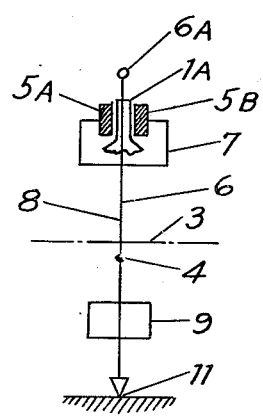
Fig. 3 is a diagrammatic view showing one position of the pendulum and spin axis.
Figure 4:
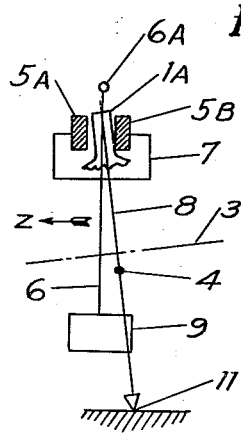
Fig. 4 is a diagrammatic view showing another relative attitude of the pendulum and spin axis with respect to the friction elements.
Figure 6:
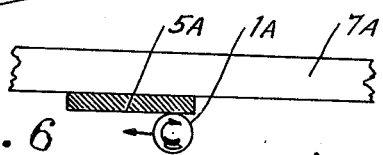
Fig. 6 is a fragmentary top plan view showing the position of the spin axis with respect to the friction surfaces, and in contact with one of said surfaces shown in section.
Figure 7:
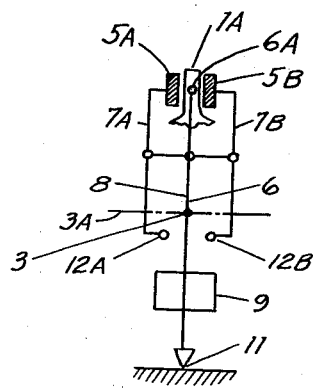
Fig. 7 is a diagrammatic view showing one position relative of the spin axis, the pendulum, and the friction surfaces of the modified form.
Figure 8:
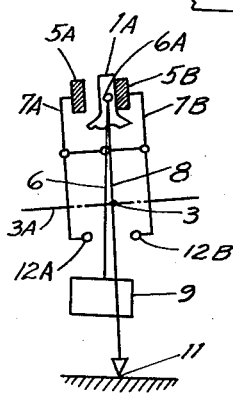
Fig. 8 is a diagrammatic view illustrating another position of the elements set out in Fig. 7.
Figure 9:
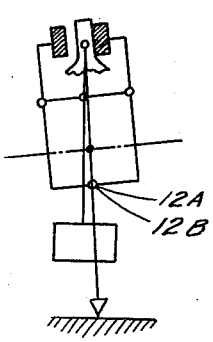
Fig. 9 is a diagrammatic view presenting a third relative position of the elements in Figs. 7 and 8.

Figs. 2 and 6 represent views from above the stabilizer, showing the relative position of the spin axis 1A and the friction contact surfaces 5A and 5B. Fig. 2 shows conditions when the contrivance is in equilibrium, and Fig. 6 shows the position of the spin axis making contact with friction surface 5A, and the arrows indicate the direction of movement and rotation. It is evident that when the contrivance tips slightly so that surface 5A contacts spin axis 1A, the latter will tend to roll on said surface, thereby inducing forced precession. 12A and 12B are pivots supporting carriers 7A and 7B in Fig. 5. Fig. 9 represents an alternative to Fig. 8, differing only to the extent that pivotal points 12A and 12B are combined at one point.

While the method described herein for obtaining forced precession has been proven very satisfactory in actual operation, it is to be understood that this invention is not to be considered as limited only to the specific means described, but includes any other method found operative, for automatically restoring equilibrium or stability of a body or contrivance naturally unstable, by means of forced precession produced upon a gyroscope through the direct contact of friction surfaces; the contact resulting from a gravity controlled pendulum actuating said friction surfaces to contact the gyroscope axis whenever the contrivance or body tends to tip or lose its equilibrium. The amount of forced precession developed as described to cause a counteractive or righting force to restore and maintain equilibrium or stability of the contrivance is always exactly the correct magnitude, because said forced precession is dependent for its magnitude upon the pressure which said friction surfaces exert upon said spin axis, and said pressure is in turn dependent upon the amount of angular tip of the contrivance out of a normal vertical position of equilibrium.

In other words, a very slight tendency of the contrivance to tip over, produces a very slight righting force, just sufficient to restore said equilibrium. On the other hand, a sudden, strong tendency to tip over, produces an equally sudden, strong counteractive righting force which gradually diminishes to zero as equilibrium is restored.

This invention, because of its simplicity and complete automatic action, can be made to function perfectly in exceedingly small contrivances such as models and toys.

Having now described this invention and the manner of its use, I claim:

1. In combination, a body having supporting means longitudinally aligned whereby the body is rendered unstable laterally, a gyroscope flywheel having a vertical axle, a motor arranged to carry and rotate the flywheel, said motor having a pivotal axis, means for supporting the motor axis transversely on said body, a pendulum pivotally attached to the body, said pendulum being provided with spaced members having an opening between them, and the said vertical axle of the flywheel being arranged between the said members whereby the lateral tilting of the body moves said axle into alternate contact with said members to level the body.

2. In combination, a vehicle body provided with single wheels at the ends whereby the body is supported in unstable position laterally, a gyroscope flywheel having a vertical axle, a motor arranged to carry and rotate the flywheel, means for supporting the motor upon the body, the pivotal axis of the motor extending transversely with respect to the body, a pendulum pivotally connected with the body, said pendulum having two spaced members and an opening between them, and said vertical axle of the flywheel being extended between said members whereby the tilting of the body moves said axle into alternate contact with said members to level the body.

3. In combination, a vehicle body provided with single wheels at the ends whereby the body is in unstable equilibrium laterally, a gyroscope flywheel having a vertical axle, a motor arranged to rotate the flywheel, means for supporting the motor upon a pivotal axis transversely upon the body, a pendulum connected pivotally with the body at points above the flywheel, the said pivotal axis of the motor being located lower than the flywheel, said pendulum having oppositely arranged members with an opening between them, and the said vertical axle of the flywheel being extended between the said members whereby the tilting of the body laterally moves the said axle into contact alternately with the said members.

RAYMOND E. TETENS.